Patented Apr. 25, 1939

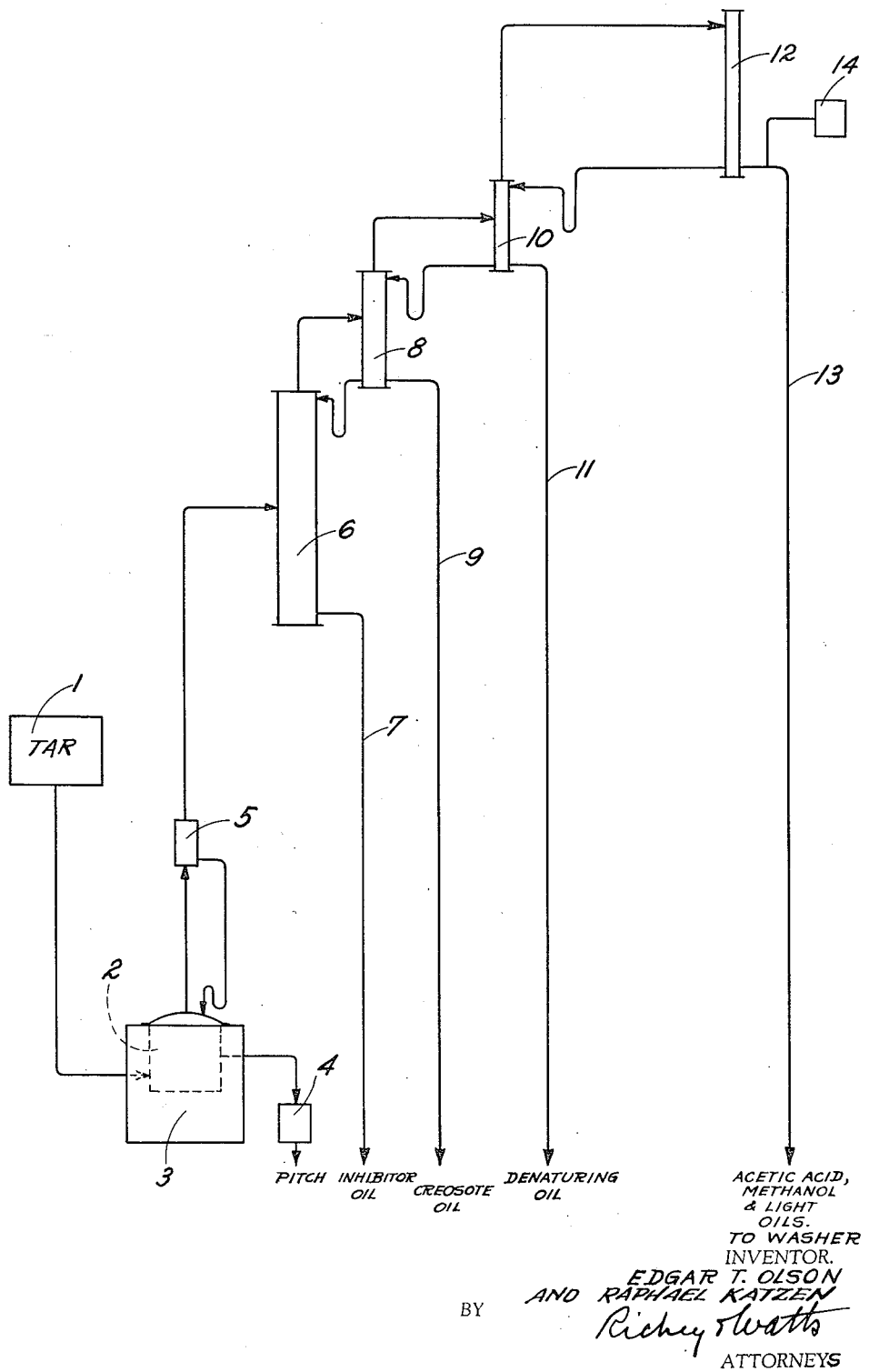

2,156,158

UNITED STATES PATENT OFFICE 2,156,158

PROCESS FOR DISTILLING TAR

Edgar T. Olson, Marquette, Mich., and Raphael Katzen, Phelps, Wis., assignors to Northwood Chemical Company, Phelps, Wis., a corporation of Wisconsin Application May 17, 1938, Serial No. 208,498

4 Claims. (Cl. 202—39)

This invention relates to the art of distilling tar derived from wood and related substances including peat, rotten wood, lignin, ligno-cellulose and other substances containing a high lignin content, and relates more particularly to a new and improved inhibitor oil and to a new and improved "wood tar" distillation method which may be carried out continuously and with new and improved results as regards the amount, character and properties of products obtained thereby.

The term "wood tar" as used in this specification and in the claims means and includes tar which has been produced from non-resinous hard woods such as beech, birch and maple, and soft woods such as bass elm, aspen and hemlock, and high lignin containing substances such as peat and rotten wood, and products produced by the hydrolysis and removal of cellulose from the foregoing lignin cellulose materials.

Heretofore wood tar has been distilled by the so-called "batch" method. According to this method the tar was first heated to a temperature of 150° C. to 170° C. and then steamed at a temperature of 160° C. to 170° C. to drive off the methanol and acetic acid which were recovered. This heating and steaming operation had the disadvantage that it polymerized the oils in the tar, thereby increasing the amount of pitch and decreasing the amount of valuable, volatile oils initially contained in the tar.

After completion of the heating and steaming operation, the steamed wood tar was transferred to a "batch pot still" where it was fractionally distilled under atmospheric pressure for a long period of time, as much as thirty-six hours' time being required to distill completely a batch of 1000 gallons of tar. This long period of heating further increased the amount of tar and decreased the amount of valuable oils, such as inhibitor oil, creosote oil and light oil. Furthermore, this prolonged heating, and the polymerizing action which attended it, made it quite difficult to obtain from the tar an inhibitor oil fraction having a boiling temperature between about 240° C. and 300° C. at atmospheric pressure and having an inhibitor ratio greater than about 1.0. Inhibitor oils are oils which are used in the treatment of cracked gasoline to prevent the formation of gummy substances in the gasoline during storage.

According to the present invention, the foregoing and other disadvantages of the prior "batch" distillation method have been avoided and new and improved results have been obtained. The present method is continuous in its operation with the resultant saving of the former costs of handling the tar in batches and between operations. Polymerization is avoided completely, or practically so, with the result that there is substantially no increase in the amount of pitch and a higher yield of volatile oils is obtained, and the several wood tar distillation products including inhibitor oil, creosote oil, denaturing oil and acetic acid, methanol and light oils are obtained continuously and separately. Moreover, an advantage of great importance is that by the present process the yield of these various wood tar distillation products is much greater than was obtainable heretofore, and the inhibitor oil which is obtained in large quantities has higher inhibitor ratios than have been obtained heretofore, so far as we know.

The present process has been extended to the treatment of various substances other than wood and not previously used as sources for inhibitor oils, so far as we know, from which valuable inhibitor oils may be produced by this process. Such substances are related to wood in the sense that they contain lignin and can be converted into tars. Such substances include peat, rotten wood, ligno-cellulose, lignin and waste liquors from wood pulping.

The drawing accompanying and forming a part of this specification is a flow sheet illustrating the present process and showing, diagrammatically, apparatus with which it may be practiced.

Wood tar to be treated by this invention flows continuously from tank 1, preferably composed of wood, thru a pipe, preferably composed of brass, into the lower part of a cast iron steel pot 2. The interior of this pot and of the subsequently described apparatus is preferably maintained under absolute pressure of between about 10 mm. to 100 mm. of mercury. The pot 2 forms part of an oil fired still 3, heat being applied to the exterior of the pot 2 in amounts sufficient to raise the contents of the pot to, and maintain them at a temperature of about 250° C. at a pressure of 10 mm. to 100 mm. Wood tar which enters pot 2 is heated to about 250° C. part of the tar being converted into vapors which pass out of the pot 2 within a few seconds after they are formed. The tar should not be heated longer than about four hours and to that end the rate of flow of wood tar into the pot 2 is so regulated that the tar after being heated for about four hours will overflow thru an iron pipe into alternate vacuum receivers 4, the overflow being continuous.

The vapors liberated in the pot 2 pass thru a pipe, a mist separator and a succeeding pipe to column 6. These pipes, including the pipe connecting the bottom of separator 5 to pot 2 for returning liquids to the pot, and the column 6 and the separator 5 are preferably composed of an aluminum alloy. The vapors which pass into column 6 have a mean average temperature of about 180° C. at the pressure above specified but include vapors having a mean average temperature of about 210° C. These vapors are partially condensed and fractionated in column 6 and the condensate is drawn off thru a tube 7, preferably composed of aluminum and constituting a barometric leg. This condensate is an oil, which is suitable for use as an inhibitor oil in preventing gum formation in cracked gasoline and has a boiling range of from about 240° C. to about 300° C. at atmospheric pressure.

The uncondensed vapors which pass out of column 6 flow thru a tube to a column 8, the tube and column being preferably composed of copper. These vapors have an average mean temperature of about 120° C. at the stated pressure. In column 8 the vapors are partly condensed and fractionated and the condensate is drawn off thru tube 9, preferably composed of copper, and constituting a barometric leg. This condensate consists mainly of creosote oil containing guaiacol. A pipe and trap connect the bottom of column 8 with the top of column 6.

The uncondensed vapors which pass out of column 8 have an average mean temperature of about 80° C. All these vapors pass thru a tube to a column 10 wherein the vapors whose average mean temperature is about 80° C. at 10 mm. to 100 mm. pressure are partly condensed and fractionated, the condensate being drawn off thru pipe 11 constituting a barometric leg. These tubes and column 10 are preferably composed of copper. This condensate consists mainly of light oils containing denaturing compounds. A pipe and trap connect the bottom of column 10 to the top of column 8.

The uncondensed vapors which pass out of column 10 and which have an average mean temperature of about 50° C. at between about 10 and about 100 mm. pressure, flow thru a tube into condenser 12 wherein they are condensed and cooled to about 15° C. and the resulting condensate is drawn off thru tube 13 constituting a barometric leg. These tubes and condenser 12 are preferably composed of an alloy known as Herculoy, or copper. This condensate consists of water, methanol, acetic acid and water soluble and unsoluble oils. This condensate may be passed thru a continuous, counter-current scrubber (not shown) of suitable and well known form wherein the methanol and acetic acid may be separated and later recovered. The residual light oil remaining after such separation may be used as fuel under still pot 2. A pipe and trap connect the bottom of condenser 12 with the top of column 10.

To maintain these various temperatures and to perform the various fractionations in columns 6 and 8 reboiler heat may be supplied from an outside source; or coils in the bottom of each column may be supplied with heat by circulation of hot oil. Also if necessary reflux may be passed from condenser 12 to column 10, from column 10 to column 8, from column 8 to column 6, from column 7 to mist separator 5, and from mist separator 5 to still pot 2.

The absolute pressure of 10 mm. to 100 mm. in the system above mentioned may be maintained in any suitable manner but, as shown, is maintained by a vacuum jet or vacuum pump indicated at 14.

It will be understood from the foregoing description that the present process is not only continuous but does not involve any manual handling of materials between the time the wood tar is placed in tank 1 and the pitch and condensates are collected at the several described stations. It will further be understood that the process is quite rapid, that the vapors driven off from the wood tar in pot 2 are exposed for only a short time, for example, 2 or 3 seconds, to the pot temperature of about 250° C. and hence polymerization of the vapors is negligible in amount with corresponding increase in yield and uniformity of oils, particularly inhibitor oil. Furthermore, the wood oil inhibitors obtained by this process are of a high degree of uniformity and possess inhibitor ratios which are above about 1.4 and have a boiling range of between about 240° C. and 300° C. at atmospheric pressure. Higher ratios may be had by decreasing the boiling range of the fraction. For example, a ratio of about 1.7 may be obtained by limiting the boiling range to between about 260° C. and about 280° C.

The process which has been described in detail hereinabove as practiced on wood tar, may be employed to good advantage on materials other than wood tar, for the production of inhibitor oils. For this purpose tar is made by carbonizing, at temperatures below 400° C. as a maximum, materials having a high lignin content such as pure lignin, ligno-cellulose derived from wood by acid hydrolysis, peat, rotten wood and residuals in waste liquors from paper pulping. Such tar, which for brevity may be termed "lignin tar", may be treated in the manner above described in connection with wood tar. The high temperature vapors which are condensed in column 6 and drawn off thru tube 7, form valuable inhibitor oils. These lignin tar inhibitor oils have inhibitor ratios ranging from about 1.2 to about 3.5 as is shown by the following table which specifies the material which was carbonized to make the tar, and also the ratios of the oils obtained from such tars:—

Rotten wood_____ 1.2–1.8
Peat_____ 1.5–2.0
Ligno-cellulose (60% lignin, 40% cellulose)_____ 1.5–2.0
Substantially pure lignin_____ 2.0–3.5

These wood oil and lignin oil inhibitors are alike in most respects. They both possess a clear, transparent, amber color, have a boiling temperature range between about 240° C. and 300° C. at atmospheric pressure with less than about 2% thereof being distillable below 218° C. (425° F.) at atmospheric pressure as determined by distilling a 100 cc. sample in an Engler distilling apparatus similar to A. S. T. M. Ser. No. D86–27 where the rate of distillation is from 4 to 5 cc. per minute, have a water content of less than about 1%, contain less than about 3% of insoluble matter, give negative stain results and have color drop value which is not less than about 22.

The inhibitor ratio above referred to is the ratio which is found to exist between the induction period of a standard gasoline containing the inhibitor under test, minus the induction period of the gasoline itself, on the one hand, and the induction period of the standard gasoline containing a standard inhibitor minus the induction period of the standard gasoline. This ratio is expressed as follows:

$$\frac{\text{(I. P. of gasoline and inhibitor to be tested)} - \text{I. P. of gasoline}}{\text{(I. P. of gasoline and standard inhibitor)} - \text{I. P. of gasoline}}$$

The ratio of an inhibitor may be determined by the method briefly described as follows: Three similar oxygen bombs are arranged in a temperature controlled water bath, the bombs containing respectively equal amounts of the three substances just mentioned, that is, standard gasoline containing the inhibitor being tested, standard gasoline containing a standard inhibitor, and one separate lot of standard gasoline not containing any inhibitor. After the bombs have been purged of nitrogen, air and the like by passing oxygen thru the bombs, oxygen at a pressure of 110 pounds per square inch is confined in the bomb. When the oxygen so confined has reached the temperature of the bombs and water bath, which is at about 60° to 70° F., the oxygen pressure is reduced to about 100 pounds per square inch. Then the valves in the oxygen lines are closed and the temperature of the bath is increased to about 212° F. as rapidly as possible, which temperature is maintained until the pressure shows a sharp drop of five pounds per square inch or more. When that drop occurs, heating of the bombs is discontinued and they are cooled slowly.

The test begins when the oxygen lines are closed and the heating of the bombs from temperature of 60° to 70° F. is initiated, and it ends when the sharp drop of five pounds pressure per square inch occurs. The sharp drop just mentioned indicates that the rate of absorption of oxygen by the liquid in the bombs has reached the rate of 1 cc. per minute.

Fifteen minutes are subtracted from the total time of the test as a correction for lag in the pressure recorder. This correction is necessary because there is a lag in heating at the starting of the test, such lag amounting to from about 30 to about 45 minutes before the bomb records its maximum pressure. The substitution of the times of tests thus corrected in the formula above stated results in the ratio of the inhibitor being tested.

The inhibitors of this invention possess all the properties and characteristics of the present-day, approved inhibitors and possess many properties superior to those of prior inhibitors.

The present invention provides new inhibitors obtainable from substances from which satisfactory inhibitors have not previously been made and greatly extends the source of satisfactory inhibitors.

Having thus described the present invention so that others skilled in the art may be able to understand and practice the same, we state that what we desire to secure by Letters Patent is defined in what is claimed.

What is claimed is:

1. The method of producing inhibitor oils which comprises the steps of substantially continuously introducing "wood tar" into a pot still and heating it therein to a temperature of about 250° C. and under a pressure of between about 10 mm. and about 100 mm., continuously withdrawing the thereby liberated mixed vapors from the said still before polymerization therein can take place to a material extent, and while maintaining said mixed vapors under said pressure and before polymerization can take place therein to a material extent, condensing the portion of said vapors having a mean average temperature of about 210° C., and continuously withdrawing pitch from said pot still.

2. The method of producing inhibitor oils which comprises the steps of substantially continuously introducing "wood tar" into a pot still and heating it therein to a temperature of about 250° C. and under a pressure of between about 10 mm. and about 100 mm., thereby liberating mixed vapors, and while maintaining said vapors under said pressure, continuously removing them from said still as rapidly as they are liberated and condensing the portions thereof having a mean average temperature of about 210° C. before polymerization therein can take place to a material extent, and substantially continuously removing pitch from said pot still.

3. The method of producing inhibitor oils which comprises the steps of substantially continuously introducing "wood tar" into a pot still and heating it therein to a temperature of about 250° C. and under a pressure of between about 10 mm. and about 100 mm., thereby liberating mixed vapors, and, while maintaining said vapors under said pressure, continuously removing them from said still as rapidly as they are liberated and condensing, in a column composed of an aluminum alloy, the portions thereof having a mean average temperature of about 210° C. before polymerization therein can take place to a material extent, and substantially continuously removing pitch from said pot still.

4. An inhibitor oil for use in preventing formation of gummy substances in cracked gasoline characterized by being clear and transparent, having amber color, an inhibitor ratio of between about 1.2 and about 3.5, a boiling temperature of between about 240° C. and about 300° C. at atmospheric pressure with less than about 2% thereof being distillable below 212° C. at atmospheric pressure, and possessing other properties characteristic of those obtained when "wood tar" is substantially continuously introduced into a pot still and heated therein at a temperature of about 250° C. under a pressure of between about 10 mm. and about 100 mm. and the thereby liberated mixed vapors are removed from the still as rapidly as they are liberated and the portions thereof having a mean average temperature of about 210° C. are condensed while under said pressure and before polymerization can take place to a material extent.

EDGAR T. OLSON.
RAPHAEL KATZEN.